United States Patent [19]

Chew et al.

[11] Patent Number: 5,207,110

[45] Date of Patent: May 4, 1993

[54] SUSPENSION DEVICE FOR LOW-FREQUENCY STRUCTURES

[75] Inventors: Meng-Sang Chew, Virginia Beach; Jer-Nan Juang, Poquoson, both of Va.; Li-Farn Yang, Boulder, Colo.

[73] Assignee: The United States of America as represented by the United States National Aeronautics and Space Administration, Washington, D.C.

[21] Appl. No.: 678,553

[22] Filed: Mar. 28, 1991

[51] Int. Cl.⁵ ............................................. B64G 7/00
[52] U.S. Cl. ................................ 73/866.4; 73/865.6; 248/328; 434/34
[58] Field of Search ............... 73/865.6, 866.4, 865.3, 73/862.56; 434/34, 302; 248/330.1, 328, 327

[56] References Cited

U.S. PATENT DOCUMENTS

| | | | |
|---|---|---|---|
| 2,810,836 | 10/1957 | Hutgens | 73/865.6 X |
| 3,010,220 | 11/1961 | Schueller | 73/865.6 X |
| 3,196,690 | 7/1962 | Brooks | 73/865.3 |
| 3,298,226 | 1/1963 | Hildebrandt | 73/862.56 X |
| 3,339,418 | 9/1967 | Paynter et al. | 73/865.3 |
| 3,570,315 | 3/1971 | Likeness et al. | 73/865.6 |
| 3,765,639 | 10/1973 | Mystrom | 248/591 |
| 3,851,344 | 12/1974 | Zerthammer | 5/136 X |
| 4,003,552 | 1/1977 | Sobolewski | 254/283 |
| 4,007,623 | 2/1977 | Shillinger, Jr. | 73/865.3 X |
| 4,643,420 | 2/1987 | Riley et al. | 267/285 U X |
| 4,779,712 | 10/1988 | Petercsak et al. | 244/173 X |
| 4,860,600 | 8/1989 | Schumacher | 73/865.6 |
| 4,884,454 | 12/1989 | Johnson | 73/865.6 X |
| 4,995,272 | 2/1991 | Reed, III et al. | 73/866.4 X |
| 5,110,294 | 5/1992 | Brand et al. | 73/865.6 X |

FOREIGN PATENT DOCUMENTS 1523933  11/1989  U.S.S.R. ............................ 73/886.4

Primary Examiner—Tom Noland
Attorney, Agent, or Firm—Kevin B. Osborne

[57] ABSTRACT

A suspension device is provided for simulating the free-free boundary conditions of space for a low frequency structure. A support cable is connected at one end to the test structure and is vertically guided by a guiding ring. The other end of the cable is connected to a cam having an outer circumference which supports the cable. A drive axle passes through the cam center of rotation and is rotatably journalled in a suitable manner to a rigid structure. Two torsion springs are provided about the drive axle. One end of each spring is connected to a respective face of the cam and the other end is connected to the fixed support. The cam is shaped and the torsion springs selected such that $Wr_{(t)} = T_{s(t)}$, wherein W is the weight of the test structure; $r_{(t)}$ is the instantaneous moment arm defined as the perpendicular distance from the rotational center of the cam to the cable at time t, and $T_{s(t)}$ is the total spring torque exerted by the two springs on the cam at time t. The test structure is accordingly vertically suspended by the cable and the instantaneous moment arm compensates for any increased spring torque arising from a vertical displacement of the test structure to simulate space conditions.

6 Claims, 4 Drawing Sheets

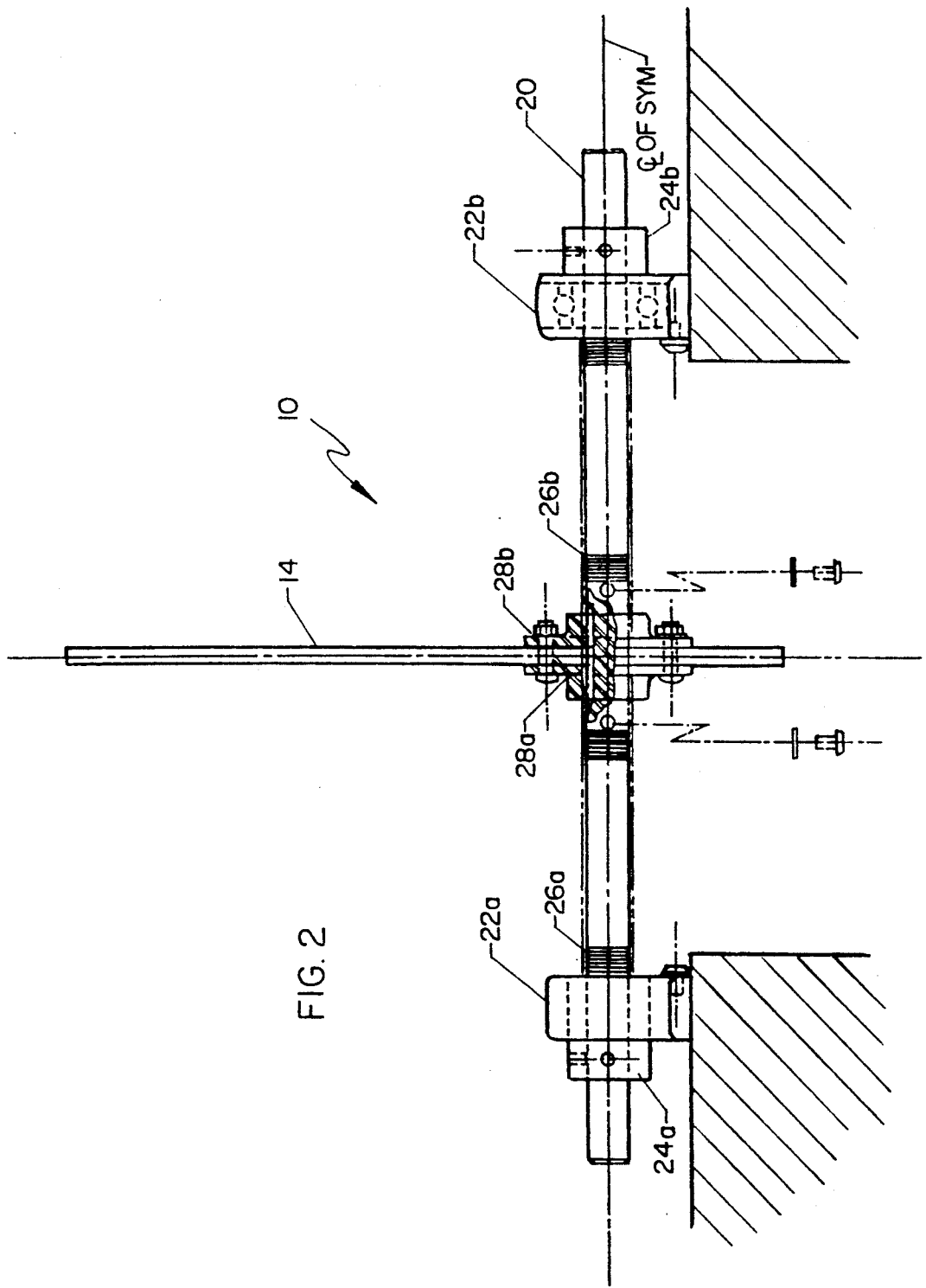

SUSPENSION DEVICE FOR LOW-FREQUENCY STRUCTURES

ORIGIN OF THE INVENTION

The invention described herein was jointly made by employees of the United States Government and an employee of the Old Dominion University Research Foundation, and may be used by and for the Government for governmental purposes without the payment of any royalties thereon or therefor.

BACKGROUND OF THE INVENTION

1. Field of the Invention

The present invention relates generally to ground-based dynamic testing of low-frequency structures and more particularly to a suspension device for testing such structures.

2. Description of the Related Art

Space structures in general experience free-free boundary conditions that are not readily replicable in ground based dynamic testing. Numerous devices have been proposed to conduct dynamic tests while supporting the weight of the structure without introducing any constraining forces which can impose boundary conditions not found in space. For example, long cables have been used to suspend the structures from a high ceiling. Dynamics testing is conducted in the horizontal plane to reduce any gravitational effects on the structural dynamics. However, this suspension gives rise to an undesired pendulum effect as the induced horizontal motion combines with the vertical cable support. In addition, this proposal has the additional drawback of large space requirements for the high ceilings and the introduction of undesired low frequency vibrations to the structures during movement due to elasticity of the long cables.

Various other designs are based on the principle of reducing or eliminating friction in the horizontal plane. The most common design involves air pads which act as hydrostatic air bearings to suspend the structure. Once again the testing is performed in the horizontal plane. These air bags are incorporated into the structure and may have a mass sufficient to distort the actual dynamic characteristics of the structure. In addition, this proposal requires a large air table as well as air pumps, filters and other pneumatic equipment to reduce the friction between the air pads and the air table.

A pneumatic electric device is also used comprising an external air tank under pressure for driving a piston supporting the test structure. Since the pneumatic system incurs a positive spring stiffness, a linear D.C. motor is incorporated to introduce a negative spring stiffness to the pneumatic system to create a perspective of a low stiffness toward the structure. This requires a very complex control system with closed loop feedback to ensure proper operation and stiffness compensation.

Finally, various spring configurations have been proposed which attempt to introduce a near zero stiffness of the suspension system. These configurations only result in a very small domain of operation, i.e., a very small stroke, through which the test structure can move without any constraining force.

OBJECTS OF THE INVENTION

It is accordingly an object of the present invention to provide a suspension device for low frequency structures for ground based dynamic testing which approximates the free-free boundary conditions of space.

It is another object of the present invention to accomplish the foregoing object in a simple manner.

It is a further object of the present invention to accomplish the foregoing objects with minimal space requirements.

It is yet another object of the present invention to achieve the foregoing objects while ensuring an adequate domain of operation.

Additional objects and advantages of the present invention are apparent from the specification and drawings which follow.

SUMMARY OF THE INVENTION

The foregoing and additional objects are obtained by a suspension device for low frequency structures according to the present invention. A support cable is connected at one end to the test structure and is vertically guided by a guiding ring. The other end of the cable is connected to a cam having an outer circumference which supports the cable. A drive axle passes through the cam center of rotation and is rotatably journalled in a suitable manner to a rigid structure. Two torsion springs are provided about the drive axle. One end of each spring is connected to a respective face of the cam or to the drive axle and the other end is connected to the fixed support. The cam is shaped and the torsion springs selected such that $Wr_{(t)} = T_{S(t)}$, wherein W is the weight of the test structure; $r_{(t)}$ is the instantaneous moment arm defined as the perpendicular distance from the rotational center of the cam to the cable at time t, and $T_{S(t)}$ is the total spring torque exerted by the two springs on the cam at time t. The test structure is accordingly vertically suspended by the cable and the instantaneous moment arm compensates for any increased spring torque arising from a vertical displacement of the test structure to simulate space conditions.

BRIEF DESCRIPTION OF THE DRAWINGS

FIG. 2 is front view of the suspension device of FIGS. 1(a) and 1(b);

DETAILED DESCRIPTION OF THE PREFERRED EMBODIMENTS

Figure 1B:
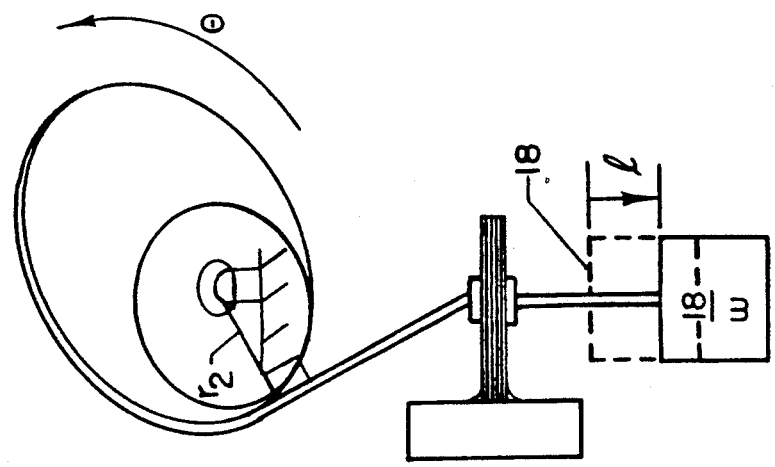
FIG. 1(b) is a side view of the FIG. 1(a) embodiment rotated through an angle $\theta$.
Figure 1A:
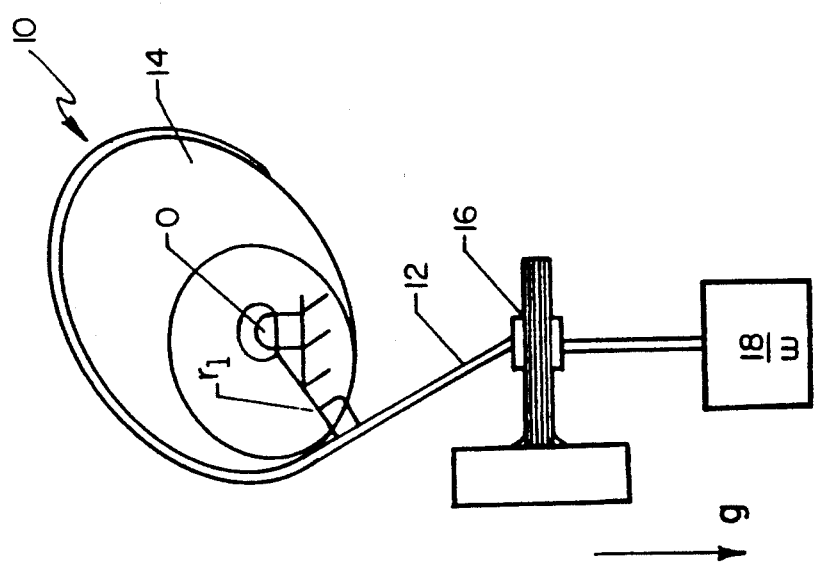
FIG. 1(a) is a side view of the suspension device according to the present invention for low frequency structures shown in an initial position.

Referring to FIGS. 1(a), 1(b), and 2, a suspension device 10 according to the present invention is shown. A thin cable 12 is wrapped around the circumference of a non-circular disc or cam 14 and is connected at one end thereto. This circumference may be grooved to facilitate any movement as discussed below. The cable extends from the circumference of the cam 14 through an immovably fixed, vertical orienting ring 16 and then extends vertically downward to suspend a schematically represented test structure 18 connected to the other end of the cable.

Turning now to FIG. 2, cam 14 is supported by a drive axle 20 fixed through the cam rotational center and rotatably journalled at both ends in immovably fixed supports 22a and 22b. Collars 24a and 24b are located about axle 20 at the outside faces of the supports. Torsional springs 26a and 26b extend around axle 20 and are respectively connected at one end to supports 22a and 22b. Each torsional spring is connected at its other end to respective axial hubs 28a and 28b fixed to opposite faces of cam 14 or to drive axle 20. To prevent cable 12 and the attached structure 18 from driving cam 14, the torsional springs 26a and 26b are selected such that the combined torque $T_{s1}$ of the two torsional springs equals the load imposed by the test structure 18 on the cam 14, i.e., such that:

$$Wr_1 = T_{s1} \tag{1}$$

wherein W is the weight of the test structure 18 and $r_1$ is the instantaneous moment shown in FIG. 1(a) for position 1.

Referring once again to FIGS. 1(a) and (b), test article 18 may be displaced vertically downward a distance l from position 1 to position 2. To maintain test structure 18 in equilibrium at position 2, the new instantaneous moment arm $r_2$ needs to be larger than $r_1$ to compensate for the increased torsional spring torque $T_{s2}$ in the new equilibrium equation wherein the load W and resultant cable tension is the same, i.e., such that:

$$Wr_2 = T_{s2}. \tag{2}$$

This difference in moment arms $(r_2-r_1)$ allows the profile of cam 14 to be determined such that a continuous change in the moment arm will result to compensate for any increased torsional spring torque arising from a vertical displacement of the structure 18. In general terms the cam profile is generated by integrating the relationship $Wr_{(t)} = T_{s(t)}$ over time for rotating the cam wherein W is the weight of test structure 18, $r_t$ is the moment arm at time t, and $T_{s(t)}$ is the torque generated in cam 14 by torsional springs 26a and 26b at time t. The equilibrium equation of equation (1) can be further written as $$k_s(\theta_{s0}+\theta_1) = Wr_1 \tag{3}$$

where $\theta_{s0}$ is the angle due to the preload in the torsional springs S, and $\theta_1$ is the rotational displacement of cam 14 caused by the test structure 18. Note that this equation provides an explicit relationship between the angle of rotation $\theta_1$ of the noncircular cam 14 and the moment arm $r_1$.

In the new equilibrium position 2:

$$k_s(\theta_{s0}+\theta_2) = Wr_2 \tag{4}$$

where $\theta_2$ is new rotational displacement of cam 14, as illustrated in FIG. 1(b). Note that the moment arms $r_1$, $r_2$ are not the radial distances to the points of tangency of the cable 12 at the cam profile, but rather are the perpendicular distances from the cam rotational center O to the cable 12. Since the moment arm $r_2$ is different from $r_1$, it is possible to determine the profile of the noncircular cam 14 such that a continuous change in the moment arm is obtained for any given position of the test structure 18, in such a way that when displaced from one position of static equilibrium to another position, the test structure will remain in static equilibrium at this new position. This constant static equilibrium results in a weightless situation which simulates a space environment.

The static characteristic of the suspension system is thus governed by equations (1)-(4). Compared with prior suspension systems discussed hereinabove, where complicated electrical devices or the huge facilities are needed, this band drive suspension system is a rather simple mechanical system. Obviously, the circumferential profile of noncircular cam 14 plays a very crucial role in this suspension system. The profile coordinates of the noncircular cam 14 are derived by using envelope theory in conjunction with the equilibrium equations given by equations (1)-(4).

Figure 3:
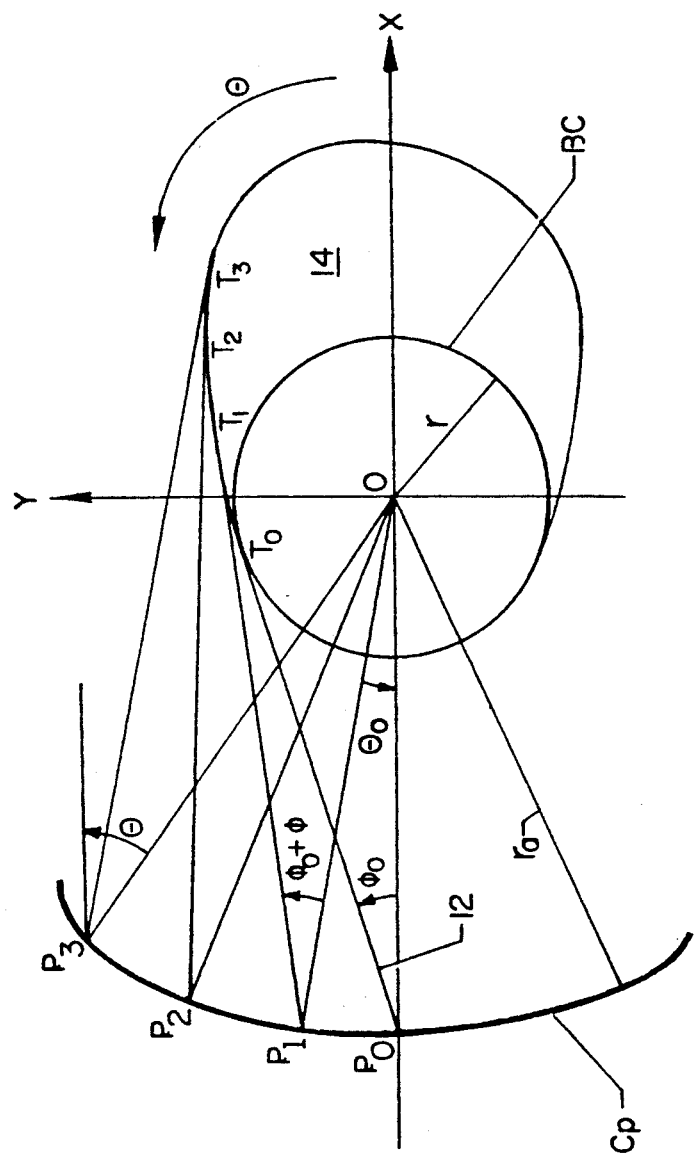
FIG. 3 is a side view showing the generation of a cam profile.

Envelope theory will be applied to generate the coordinates of the cam profile given in FIG. 3. Using kinematic inversion, as the cam 14 rotates an observer fixed on the cam would view the sequential positions of the cable 12, as a sequence of straight trajectories $$\overline{P_0T_0}, \overline{P_1T_1}, \overline{P_2T_2}, \ldots, \overline{P_nT_n}$$

as shown in FIG. 3. The swinging point $P_i (i=1,2,\ldots,n)$ is observed to lie on a circular path CP with a radius $r_a$, which is the distance from the rotational center O of cam 14 to the ring 16. A combination of these straight trajectories when taken infinitesimally apart gives the envelope which forms the cam profile. Assuming that the initial swinging point $P_o$ is tangent both to the cam profile and to a base circle BC sharing origin O and having a radius $r_b$, the angle $\phi_o$, which denotes the starting rotational position of the cable 12, is given by $$\phi_0 = \sin^{-1}\left(\frac{r_b}{r_a}\right). \tag{5}$$

Suppose that the cable is viewed by the observer at center O, while the cam rotates through an angle $\theta$. Then the thin cable will subtend an angle of $\phi_o+\phi$ with the vertical, at the ring. The increment angle $\phi$ is the rotational displacement of the string trajectory $\overline{PT}$ from its initial orientation. Therefore there exists a relationship between cam rotational angle $\theta$ and the string angular displacement $\phi$. This relationship will be derived using the equilibrium equations (2) and (4). A general equation of the family of lines forming the envelope is governed by a straight line which is:

$$y = mx + b \tag{6}$$

where the slope of the swinging string at the disk angular position $\theta$ is given by $$m = \tan(\phi+\phi_o-\theta) \tag{7}$$

and y-intercept of the cable $\overline{PT}$, based on the cartesian system in FIG. 3, is $$b = r_a \cos\theta \tan(\phi+\phi_o-\theta) + r_a \sin\theta. \tag{8}$$

This general equation of the cable $\overline{PT}$ in equation (7) gives a one-parameter family of strings as a function of the cam angle of rotation $\theta$. From the theory of envelopes, an envelope of the family of the straight lines is governed by an equation:

$$F(x,y,\theta) = y - mx - b = y - \tan(\phi+\phi_o-\theta)[x+r_a\cos\theta] - r_a\sin\theta = 0. \tag{9}$$

Equation (9) is continuous and is a continuously differentiable function in the coordinates x and y as well as in the variable $\theta$. Differentiating the equation (9) with respect to the cam angle $\theta$ provides $$\frac{\partial F}{\partial \theta} = \tan\beta(r_a \sin\theta) - x + r_a\cos\theta]\sec^2\beta\left(\frac{\partial \phi}{\partial \theta} - 1\right) - r_a\cos\theta = 0 \quad (10)$$

where $\beta$ equals $\phi + \phi_o - \theta$. The coordinates of cam profile at a given angle $\theta$ may be obtained by solving equations (9) and (10), i.e.:

$$x = -r_a[A \sin \beta + \cos \theta] \quad (11)$$

where $$A = \frac{\cos(\theta + \beta)}{\frac{\partial \phi}{\partial \theta} - 1} \quad (12)$$

Substituting equation (11) into equation (9) provides $$y = r_a[-A \sin \beta + \sin \theta]. \quad (13)$$

Initially, the angles $\theta$ and $\phi$ equal zero so that the starting coordinate of the noncircular cam becomes:

$$x = -2r_a\sin\left(\frac{\phi_0}{2}\right), \quad (14)$$

$$y = \frac{\sin 2\phi_0}{2} \quad (15)$$

which coincides with the point at which the starting cable $\overline{PT_o}$ is tangent to the base circle in FIG. 3.

The rate of change of the cable orientation with respect to cam rotation, $\partial\phi/\partial\theta$, can be determined by investigating the relationship between the angles $\phi$ and $\theta$. Based on equation (2) and illustrated in FIG. 2, the equation of the initial equilibrium is governed by:

$$Wr_a \sin \phi_o = k_s\theta_o \quad (16)$$

For the incremental angles of $\theta$ and $\phi$, from the initial orientation angles $\theta_o$ and $\phi_o$, the new equilibrium state becomes:

$$Wr_a \sin (\phi_o + \phi) = k_s(\theta_o + \theta) \quad (17)$$

Subtracting equation (16) from equation (17) provides:

$$Wr_a[\sin (\phi_o + \phi) - \sin \phi_o] = k_s\theta \quad (18)$$

which can be rewritten as $$\phi = \sin^{-1}\left[\frac{k_s\theta}{Wr_a} + \sin\phi_0\right] - \phi_0. \quad (19)$$

Differentiating equation (19) with respect to the anlge $\theta$ yields $$\frac{\partial \phi}{\partial \theta} = \frac{k_s}{Wr_a\cos(\phi_0 + \phi)}. \quad (20)$$

Then, the profile of the noncircular cam is determined by substituting $\phi$ and $\partial\phi/\partial\phi$ from equations (19) and (20) into the equations for the cam coordinates given by equations (11) and (13). Note that the profile of the cam must be convex.

Several parameters are needed to generate the profile of the noncircular cam, and they include $r_a$, $r_b$, $k_s$, and W. It can readily be shown that each cam profile can be specified according to a parameter which is the ratio of the weight of the test article to the stiffness of the torsional spring, i.e., $W/k_s$. This means that if testing is to be conducted for another test article twice its original weight, the torsional spring stiffness must be increased by the same factor so that the same cam can again be used. More generally, the new springs are selected such that the ratio $W/k_s$ is unchanged for the new weight 18. Such a design, therefore, permits tremendous flexibility since different loads can be used on this device, without the need to fabricate a new cam every time a new test article with a different mass is used.

Figure 4:
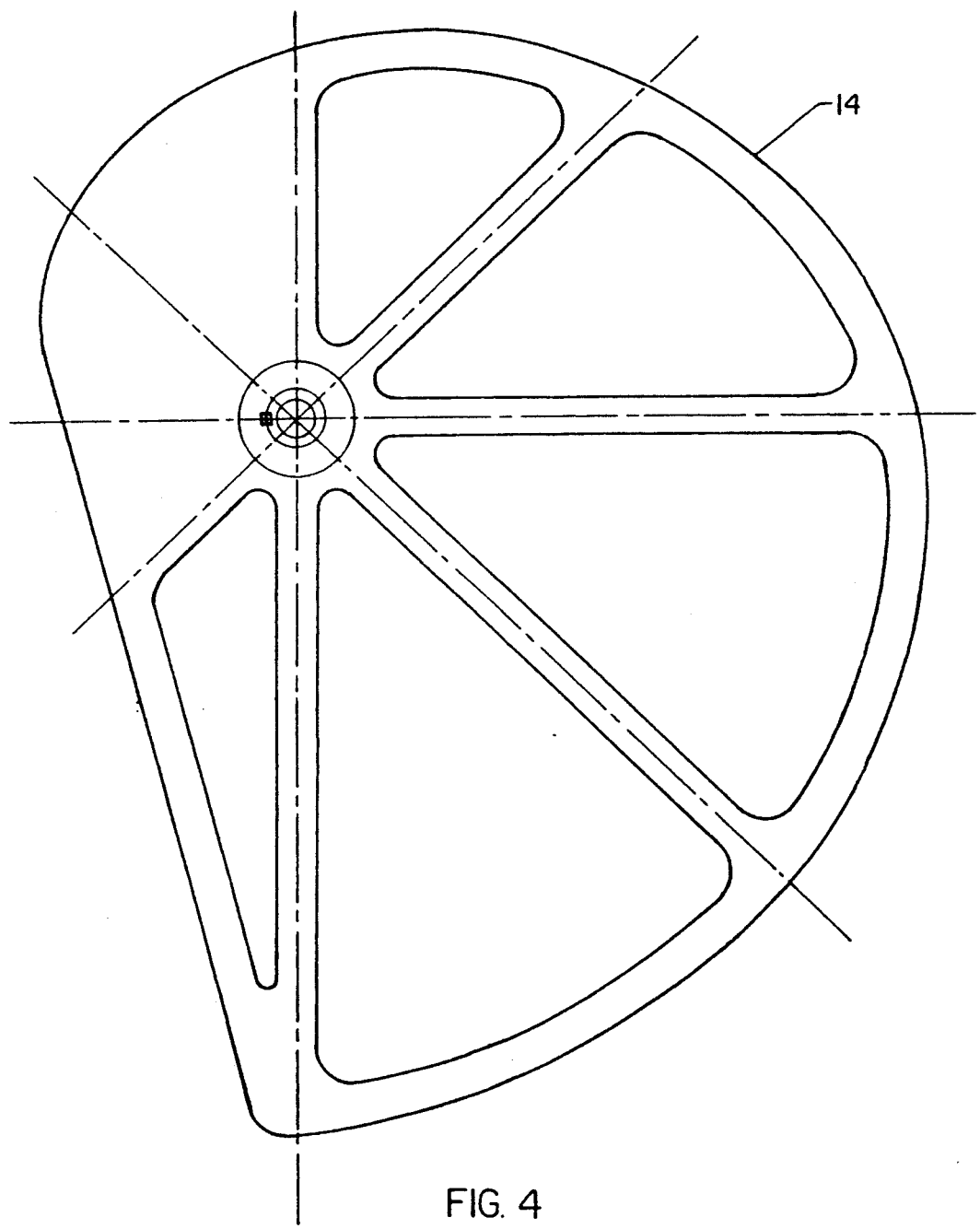
FIG. 4 is a side view of a particular cam generated by the profile generation depicted in FIG. 3.

A particular cam profile is shown in FIG. 4. Thus, any vertical displacement of the structure 18 from an original static equilibrium position results in a new static equilibrium position. This is exactly the motion experienced in space, i.e., that any object displaced from one position of static equilibrium to another position will remain in static equilibrium at the other position.

This cam profiling also allows simulation of an article subjected to an impulse in space which will translate at a constant velocity. When the test structure 18 is imposed with an initial velocity $V_o$, the test structure will continue to travel over a considerable range at a constant velocity $V_o$ because the tension in the cable is equal to the weight of the test article, resulting in no net driving force on the article during its entire range of motion as is the case in space.

The torsional springs 26a and 26b have been described as linear. However, non-linear rate torsional springs may also be used so long as the cam profile generated by the required moment arm reflects this new non-linear spring rate. If this non-linear spring rate is a zero rate, i.e., a constant load torsional spring, the profile of the cam would be circular.

Accordingly, the present invention simulates the conditions of space in a simple, inexpensive manner without the need for complicated drivers or large space requirements. The range of motion of the article permitted by the present invention is relatively large, allowing for an increased collection of experimental data. Also, the inertia of the suspension device is small, thereby avoiding any appreciable modification of the dynamic characteristics of the test article.

Many modifications, improvements and substitutions will become apparent to one skilled in the art without departing from the spirit and scope of the present invention as described in the specification and defined in the following claims.

What is claimed is:

1. A suspension device for a test structure to simulate space conditions, said suspension device comprising:
   a support cable connected at one end to the test structure;

a cam having an opposite end of said support cable connected thereto, said cam having an outer circumference for supporting said support cable;
means for guiding said cable vertically downward;
a rotatably journalled drive axle passing through a center of rotation of said cam; and
a torsion spring located about said drive axle, said spring connected at a first end to said cam and at a second end to a fixed support;
wherein said cam is shaped and said torsion spring is selected to maintain the relationship $Wr_{(t)}=T_{s(t)}$, wherein W is the weight of the test structure, $r_{(t)}$ is the instantaneous moment arm defined as the perpendicular distance from the rotational center of said cam to said cable at time t, and $T_{s(t)}$ is the total spring torque exerted by said spring on said cam at time t, whereby the test structure is vertically suspended by said cable and the instantaneous moment arm will compensate for any increased spring torque arising from a vertical displacement of the test structure.

2. The suspension device according to claim 1, wherein a pair of torsion springs are located about said drive axle, each spring connected at a first end to said cam and at a second end to a fixed support, wherein the total spring torque exerted by said two springs on said cam is $T_{s(t)}$.

3. The suspension device according to claim 1, wherein said guiding means comprises a fixed, vertically orienting ring.

4. The suspension device according to claim 1, further comprising two immovably fixed supports in which the respective ends of said drive axle are rotatably journalled.

5. The suspension device according to claim 4, wherein a pair of torsion springs are provided, each torsion spring connected at one end to a respective face of said cam and a respective fixed support, wherein the total spring torque exerted by said pair of torsion springs is $T_{s(t)}$.

6. The suspension device according to claim 5, further comprising a pair of hubs, each hub fixed to a respective face of said cam and having one end of a respective torsion spring connected thereto.

* * * * *